United States Patent
Sofussen

(10) Patent No.: US 9,712,017 B2
(45) Date of Patent: Jul. 18, 2017

(54) ELECTRIC DRIVE MOTOR

(71) Applicant: Grundfos Holding a/s, Bjerringbro (DK)

(72) Inventor: Morten Sofussen, Aarhus C (DK)

(73) Assignee: Grundfos Holding a/s, Bjerringbro (DK)

( * ) Notice: Subject to any disclaimer, the term of this patent is extended or adjusted under 35 U.S.C. 154(b) by 497 days.

(21) Appl. No.: 14/367,529

(22) PCT Filed: Dec. 20, 2012

(86) PCT No.: PCT/EP2012/076505
§ 371 (c)(1),
(2) Date: Jun. 20, 2014

(87) PCT Pub. No.: WO2013/092926
PCT Pub. Date: Jun. 27, 2013

(65) Prior Publication Data
US 2015/0333593 A1    Nov. 19, 2015

(30) Foreign Application Priority Data

Dec. 23, 2011  (EP) ..................................... 11195636
Dec. 23, 2011  (EP) ..................................... 11195639
(Continued)

(51) Int. Cl.
*H02K 5/22*     (2006.01)
*H02K 11/00*    (2016.01)
(Continued)

(52) U.S. Cl.
CPC ......... *H02K 5/225* (2013.01); *F04D 13/0686* (2013.01); *H02K 11/33* (2016.01)

(58) Field of Classification Search
CPC .................................................. H02K 5/225
(Continued)

(56) References Cited

U.S. PATENT DOCUMENTS 6,707,185 B2 * 3/2004 Hemmi ................ B62D 5/0406
310/68 B
2003/0127921 A1  7/2003 Akutsu et al.
(Continued)

FOREIGN PATENT DOCUMENTS

DE    19851060 A1    5/2000
EP    1 582 751 A1   10/2005
(Continued)

OTHER PUBLICATIONS

Int'l Search Report issued on Mar. 27, 2013 in Int'l Application No. PCT/EP2012/076505.
(Continued)

*Primary Examiner* — Thomas Truong
(74) *Attorney, Agent, or Firm* — Panitch Schwarze Belisario & Nadel LLP

(57) ABSTRACT

An electric drive motor (4), in particular for a pump assembly, has a terminal box (8) arranged on the electric drive motor (4). The terminal box (8) includes a first section (10) arranged at an axial end (6) of the drive motor (4) and a second section (14) arranged radially to the first section (10). The second section (14) is radially spaced from the first section (10) and in the tangential direction has a width (b) which is larger than a diameter (d) of the first section in this direction. The second section (14) is connected to the first section (10) via a connection section (16) having two side walls which are away for one another. These two side walls extend from the second section (14) to the first section (10) and are angled to one another, such that they approach one another towards the first section (10).

21 Claims, 5 Drawing Sheets

(30) Foreign Application Priority Data

Dec. 23, 2011 (EP) .................................... 11195640
Feb. 8, 2012 (EP) .................................... 12154522

(51) Int. Cl.
*F04D 13/06* (2006.01)
*H02K 11/33* (2016.01)

(58) Field of Classification Search
USPC .............................................. 310/71, 88, 89
See application file for complete search history.

(56) References Cited

U.S. PATENT DOCUMENTS

| | | | |
|---|---|---|---|
| 2008/0304988 A1 | 12/2008 | Asaka | |
| 2009/0021091 A1* | 1/2009 | Shiino | B62D 5/0406 310/71 |
| 2009/0237905 A1 | 9/2009 | Motoda | |
| 2011/0241454 A1* | 10/2011 | Staehr | F04D 29/406 310/43 |

FOREIGN PATENT DOCUMENTS

| | | |
|---|---|---|
| FR | 2 841 525 A1 | 1/2004 |
| WO | 2008086884 A1 | 7/2008 |

OTHER PUBLICATIONS

Office Action issued Dec. 30, 2015 in CN Application No. 201280064049.2.

\* cited by examiner

ELECTRIC DRIVE MOTOR

CROSS-REFERENCE TO RELATED APPLICATIONS

This application is a Section 371 of International Application No. PCT/EP2012/076505, filed Dec. 20, 2012, which was published in the German language on Jun. 27, 2013, under International Publication No. WO 2013/092926 A1 and the disclosure of which is incorporated herein by reference.

BACKGROUND OF THE INVENTION

The invention relates to an electric drive motor, in particular for a pump assembly, having a terminal box arranged on the electric drive motor. The terminal box comprises a first section arranged at an axial end of the drive motor, and a second section arranged radially to the first section.

Electric drive motors for pump assemblies are known, which comprise a terminal box or electronics housing, in which electrical and electronic components for the control or regulation (closed loop control) of the drive motor are arranged. Such a terminal box can be arranged at different locations of the drive motor. Thus it is known to arrange the terminal box on the radial side of the drive motor on the outer periphery, or on the axial side at the axial end of the drive motor. It is also known to design terminal boxes which are arranged at the axial end and which have essentially the same outer shape or peripheral contour as the axial end of the drive motor. These terminal boxes thus form an axial extension of the motor housing or stator housing of the drive motor. Moreover, it is known to provide such terminal boxes additionally with a second section which is arranged radially to the axial section and thus projects outwards beyond the outer contour of the drive motor or its stator housing. This second section is then designed in an arched manner and bears directly on the outer periphery of the stator housing.

What is problematic is the fact that these terminal boxes, as the case may be, do not have the necessary construction space for the electronic components and moreover offer no adequate cooling for the electronic components in the inside of the terminal box.

BRIEF SUMMARY OF THE INVENTION

With regard to these problems, it is the object of the invention to provide an improved electric drive motor which comprises an electronics housing or a terminal box which provides adequate space for electronic components and moreover permits an improved cooling of the electronic components.

This object is achieved by an electric drive motor of the type described at the outset having a terminal box, characterized in that the second section is arranged radially spaced from the first section and in the tangential direction has a width (b) which is larger than a diameter (d) of the first section in this direction. The terminal box is further characterized in that the second section is connected to the first section via a connection section, which comprises two side walls which are away from one another, extend from the second section to the first section, and extend angled to one another in a manner such that they approach one another towards the first section. Preferred embodiments are to be deduced from the subsequent description as well as the attached Figs.

According to n embodiment of the invention, a terminal box or an electronics housing, in which electrical and/or electronic components for the control of the electric drive motor are arranged, is arranged on the electric drive motor. The terminal box in its geometric basic shape is formed from several sections which together form the complete shape or complete design of the terminal box. Thereby, it is to be understood that the individual sections do not form individual parts in the strict sense, but geometric basic elements, from which the complete shape of the terminal box results.

A first section of the terminal box is arranged at an axial end of the drive motor. This is preferably an axial end which is away from the drive side, seen in the direction of the longitudinal or rotation axis.

This first section of the terminal box according to a preferred embodiment has essentially the same peripheral contour as the axial end of the drive motor, i.e. it forms an axial extension of the drive motor, i.e. of its motor housing or stator housing. The outer shape and dimension of the first section thereby correspond to the outer shape and dimension of the drive motor or its stator housing on the mentioned first axial end. In the case of a cylindrical stator housing, the first section of the terminal box preferably likewise has a cylindrical basic shape with essentially the same diameter as the stator housing. Alternatively, the first section can have a peripheral contour which is a larger peripheral contour parallel to the peripheral contour of the axial end. That is, the outer periphery of the first section is spaced by a constant amount from the outer periphery of the drive motor at its axial end. For example, the first section can have a circular peripheral contour which has a larger diameter than a circular axial end of the drive motor, wherein the peripheral contour of the axial end of the drive motor, as well as the peripheral contour of the first section, extends concentrically to the longitudinal axis or rotation axis of the drive motor.

According to an embodiment of the invention, the terminal box moreover comprises a second section which with respect to the longitudinal axis or rotation axis of the drive motor is arranged radially spaced from the first section. That is, the second section is not directly adjacent the first section. The first section and second section of the terminal box are connected via a connection section. The connection section thereby likewise forms a part of the terminal box and creates the connection between the first and the second sections and holds the second section via the first section on the drive motor.

The second section of the terminal box, in the tangential direction with respect to the longitudinal axis or rotation axis of the drive motor, has a width which is larger than the diameter of the first section, which is parallel to this direction. That is, the second section extends also in the tangential direction beyond the outer sides of the first section. The connection section comprises two side walls which extend from the second section to the first section and which are away from one another. These side walls delimit the connection section in the tangential direction and extend angled to one another so that they approach one another towards the first section. The side walls then preferably merge into the side walls or the side wall of the first section which is to say they connect to this or these. The connection section is thereby designed such that the side walls of the connection section which lead to the first section extend in a manner departing from the tangentially outer side surfaces of the second section. That is, the connection section thus in an axial plan view has an essentially trapezoidal basic shape.

The first section, the second section and the connection section are preferably situated on the axial side to the drive motor and further preferably define a common interior. That is, the first section and the second section as well as the connection section are open to one another, so that together they enclose the interior of the terminal box, in which electrical and/or electronic components are arranged. Thereby, as has already been described above, it is to be understood that the first section, the second section and the connection section do not need to be designed as individual parts, but rather define geometric basic elements, from which the geometric basic shape of the terminal box is formed. The first section, the second section and/or the connection section can thereby also be connected to one another in a fixed manner or be designed as one piece or in an integral manner. Due to the preferred axial position of all three sections, one succeeds in none of the sections, in particular not even the second section, being situated in the peripheral region of the stator housing of the drive motor, so that here a maximal spacing is created which can serve for an improved cooling of all components arranged in the terminal box. The first section and the second section, as well as the connection section lying therebetween, thereby define a large interior, so that adequate space is given for the arrangement of electronic components.

The first section preferably comprises a cylindrical, in particular circularly cylindrical basic shape. A conical shape is also counted as belonging to this. Preferably, the shape is selected such that a harmonic transition between the axial end of the drive motor and the first section of the terminal box is given, so that the first section of the terminal box forms an axial extension of the drive motor or of the stator housing of the drive motor. That is, the diameter of the cylindrical section preferably corresponds to the diameter of a stator housing round in cross section, at its axial end.

The second section preferably has a prismatic, in particular a cuboid-shaped basic shape. Thereby, the second section preferably has an axial height, i.e. in the direction of the longitudinal axis or rotation axis of the pump assembly, which corresponds to the height of the first section and preferably also of the connection section. Thus, the complete terminal box, formed from the first section, the second section and the connection section, preferably has a disk-like shape of a constant axial thickness or height. The prismatic or cuboid-shaped basic shape of the second section also includes such a shape which has rounded edges or corners, but permits the geometric basic shape to be recognized as a prism or cuboid.

The connection section preferably has a basic shape with two side walls which are away from one another and which, in each case departing from a side edge of the second section, extend tangentially adjacent the first section. The side edges, departing from which the side walls of the connection section extend, are preferably side edges extending parallel to the rotation axis of the drive motor, i.e. in the axial direction. The side walls extend to the first section, preferably tangentially, in a manner such that they run out into the basic shape of the first section. It is to be understood that the basic shape of the first section in the region where this basic shape is adjacent the connection section, to the outside at the side of the connection section can then no longer be recognized as such. That is, the geometric basic shapes of the first section, the second section and the connection section can engage into one another, in order thus as a whole to form the geometric basic shape of the complete terminal box.

A terminal box formed in such a manner, seen in the plan view is then therefore preferably formed from three geometric basic elements, a quadrangle, in particular a rectangle, a trapezium and a circle, wherein these basic elements, in particular the trapezium and the circle can engage into one another, so that the side edges of the trapezium approaching one another merge tangentially into the periphery of the circle.

In a particular embodiment of the invention, the terminal box can comprise a third section which is an axial extension of the second section and is situated radially spaced from the drive motor in the peripheral region of the drive motor. An even larger interior of the terminal box is created by way of this. It is to be understood that this third section is preferably open to the second section, preferably also can be designed integrally or of one piece with the second section. The third section thereby, particularly preferably with the second section, forms a common prismatic or cuboid-shaped shape. Thereby, this cuboid-shaped or prismatic basic shape has a cross section transverse to the axial direction or rotation direction of the drive motor, which is constant over the complete axial length of the third section and preferably also of the second section. The terminal box which is formed from the first, second section, connection section and the third section, thus seen in a lateral view, has an angled shape, wherein the first section, the second section and the connection section, as previously described, extend on the axial side of the drive motor or stator housing of the drive motor, while the third section extends in an angled manner, preferably angled by 90°, to the disk-like or plate-like element formed from the first section, second section and connection section, parallel to the longitudinal axis or rotation axis of the drive motor in a manner radially spaced from the drive motor.

Further preferably, a free space is present between the outer periphery of the drive motor or the outer periphery of the stator housing and the third section of the terminal box. This permits a cooling air circulation between the outer periphery of the drive motor and the third section of the terminal box. Preferably, this free space extends in the vertical direction in at least one preset installation position of the drive motor. This permits heated air to be able to rise upwards through this free space in an unhindered manner and thus to be able to flow away.

According to a preferred embodiment, a free space can be present between the outer periphery of the drive motor and the third section of the terminal box, in which free space cooling elements for example cooling ribs arranged on the drive motor or on the terminal box, are situated. Thus, an optimized heat discharge from the terminal box and/or from the drive motor into the surroundings can be achieved in this region. The free space is created by way of the fact that the connection section holds the second section, and thus the third section, radially spaced from the outer periphery of the drive motor.

The terminal box can additionally comprise a fourth section, which is radially adjacent the first section at its side which is away from the second section. This is preferably the diametrically opposite side to the second section and the connection section. The fourth section can thereby form a radial extension of the connection section, i.e. with this design the connection section at the axial side extends past the axial end of the drive motor and merges into the fourth section. Thus the first section is completely received in the connection section and does not necessarily need to externally appear as a separate section. The continuous side walls of the connection section thereby merge into the side walls of the fourth section and are preferably tangentially adjacent the, possibly only imagined first section. The connection section and the fourth section can thus together form a basic shape which in cross section is essentially trapezoidal or triangular.

Preferably, at least two, preferably all sections of the terminal box are designed as one piece. Thereby, individual sections, preferably all sections are manufactured of plastic, in particular injection molded parts.

The walls of the individual sections of the terminal box, i.e. of the first section, of the second section, and of the connection section, as well as, optionally, of the third section and which are adjacent one another are further preferably designed such that they merge into one another in a fluent or flowing manner. That is, roundings or fluent transitions can be formed at the transition regions. The walls of the sections themselves can also differ from the described geometric basic shapes by way of curvatures or shape adaptations, so that as a whole a terminal box of an integral shape is created. Despite this, the described sections form the geometric basic elements, from which the geometric basic shape of the complete terminal box is formed.

The first section, the second section and the connection section are further usefully closed at their axial end which is away from the drive motor, by way of a common cover. This cover permits a large access to the complete interior of the terminal box, so that the electrical or electronic components to be arranged in the inside of the terminal box can be well assembled. The cover then further preferably can be provided with operating elements and/or display elements. These are well accessible from the outside at the axial end of the drive motor.

The drive motor according to the invention and according to the preceding description is preferably a constituent of a pump assembly. With such a pump assembly, it is preferably the case of a circulation pump assembly, in particular a heating circulation pump assembly. Moreover, the drive motor in such a pump assembly is preferably designed as a wet-running motor, i.e. as a canned motor. The subject matter of the invention is moreover such a pump assembly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
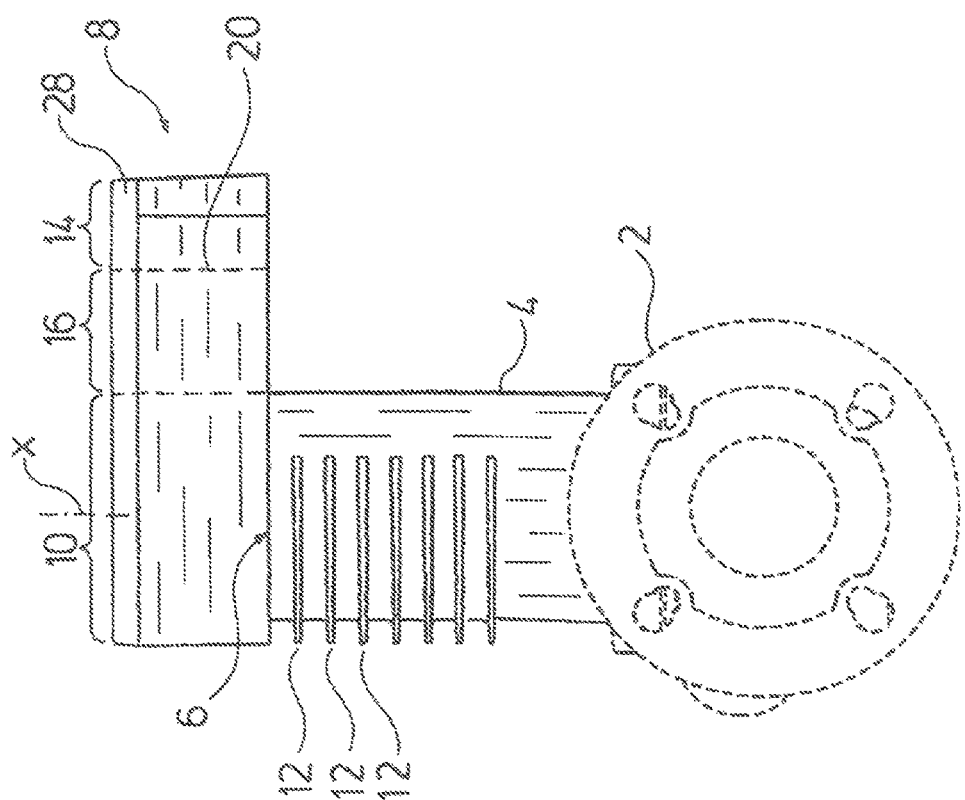
FIG. 1 is a schematic lateral view of a pump assembly according to a first embodiment of the invention.

The pump assembly shown schematically in FIG. 1 comprises a pump housing 2, onto which a motor housing or stator housing 4 connects in the axial direction X, i.e. in the direction of the longitudinal axis or rotation axis in the inside of the pump housing 2, and this motor housing or stator housing contains the stator and rotor as an electrical drive motor. The stator housing 4 thus forms the outer wall of the electric drive motor. A terminal box 8 is attached at the axial end 6 which is away from the pump housing 2, on this electric drive motor or the stator housing 4, at the axial end. The terminal box 8 forms an electronics housing, in which electrical or electronic components are arranged for the connection as well as control and/or regulation of the pump assembly or of the electric drive motor.

According to the invention, the terminal box 8 has a special shaping which is composed of several geometric basic bodies. Thus, the terminal box 8 comprises a first section 10 which is situated on the axial side of the stator housing 4 and whose outer contour has the shape of the stator housing 4 at its axial end 6, i.e. in this case is designed in a circularly cylindrical manner. The first section 10 thus forms an axial extension of the stator housing 4. The outer contour of the stator housing 4 in this case is defined by the outer periphery of the cooling ribs 12 extending on the peripheral side of the stator housing 4. The first section 10 thus, with regard to its geometric basic shape, has a circularly cylindrical shape which is represented in a dashed manner in the plan views.

Figure 2:
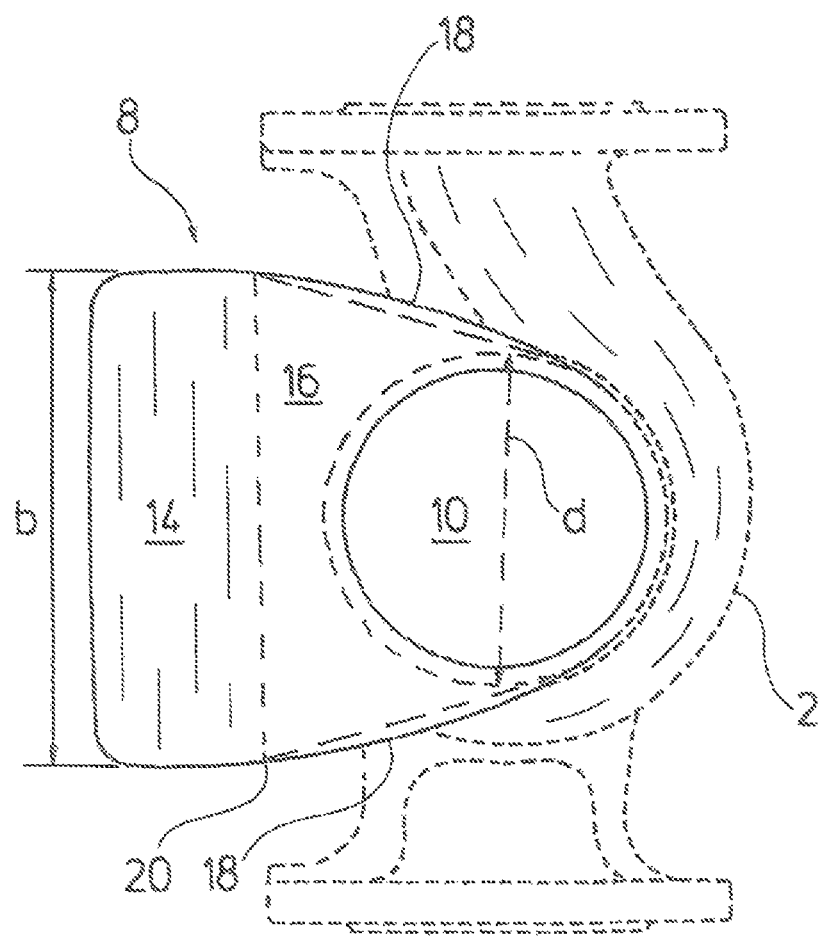
FIG. 2 is an axial plan view of the pump assembly according to FIG. 1.
Figure 3:
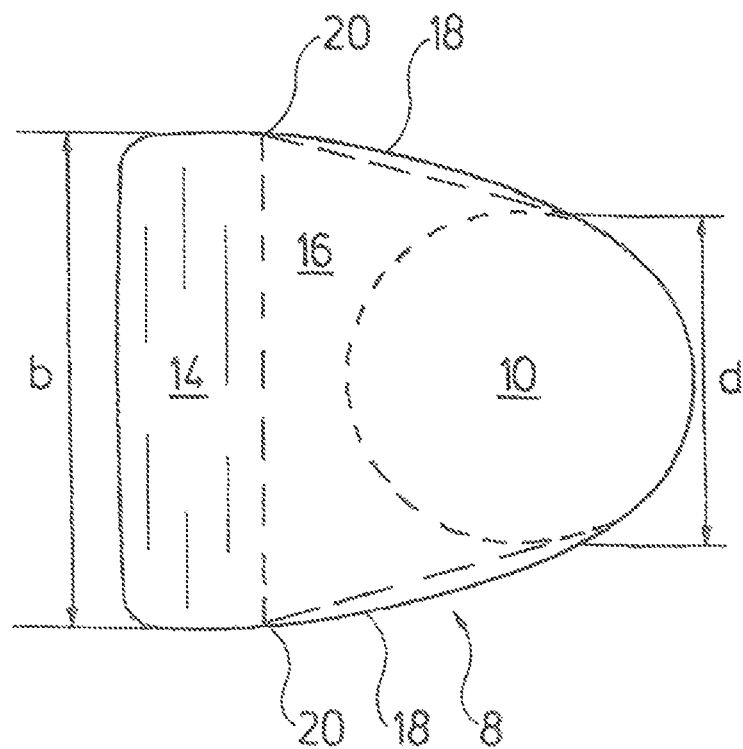
FIG. 3 is an axial plan view alone onto the terminal box according to FIGS. 1 and 2.

The terminal box 8 in a radially spaced manner comprises a second section 14, which in FIGS. 2 and 3 at its side which faces the first section 10 is delimited by the shown dashed line. The first section 10 and the second section 14 have the same axial height in the direction of the longitudinal axis X. The sections 10 and 14 are connected via a connection section 16, which likewise has the same axial height, so that as a whole a disk-like terminal box is formed by the first section 10, the second section 14 and the connection section 16.

Moreover, the terminal box comprises a second section which is arranged radially spaced from the first section of the terminal box. That is, this second section lies radially outside the projection of the drive motor or of the stator housing of the drive motor. The terminal box thus extends in the radial direction beyond the outer diameter or outer periphery of the drive motor at least with this second section. The second section of the terminal box is thereby situated radially spaced from the first section of the terminal box. That is, the second section is not directly adjacent the outer periphery of the drive motor or its stator housing or an axial projection of the outer periphery of the drive motor, but is situated lying radially further outwards. By way of this, one succeeds in this region of the terminal box being further spaced from the drive motor. Thus, an improved cooling of the components arranged in the inside in this region can be achieved.

The connection section 16, as is indicated by the dashed lines in FIGS. 2 and 3 in the plan view, has a trapezoidal basic shape. Its two side walls 18, departing from two outer side edges 20 extending parallel to the longitudinal axis X, extend towards the first section, such that they tangentially connect to the side wall or peripheral wall of the first section 10. Thereby, the cylindrical basic shape of the first section 10 engages into the trapezoidal basic shape of the connection section 16, as is represented by the round dashed line in FIGS. 2 and 3. The side walls 18 are curved slightly outwards with respect to the trapezoidal basic shape, in order to create a harmonic transition between the second section 14 and the first section 10. The second section 14, which has a cuboid-shaped basic shape, also has rounded edges, in order as a whole to achieve a smooth harmonic outer shape. The first section 10, the second section 14, as well as the connection section 16 delimit a common interior of the terminal box, in which electrical or electronic components can be arranged. With regard to the peripheral contour of the drive motor or the stator housing, it is to be understood that this can either be the peripheral contour of the actual housing or even the outer peripheral contour, which is defined by the outer periphery of cooling ribs or cooling elements, which are formed on the outer periphery of the stator housing. One can recognize in the FIGS. 2 and 3 that the second section 14 in the tangential direction has a width b which is larger than the diameter d of the first section 10.

Figure 4:
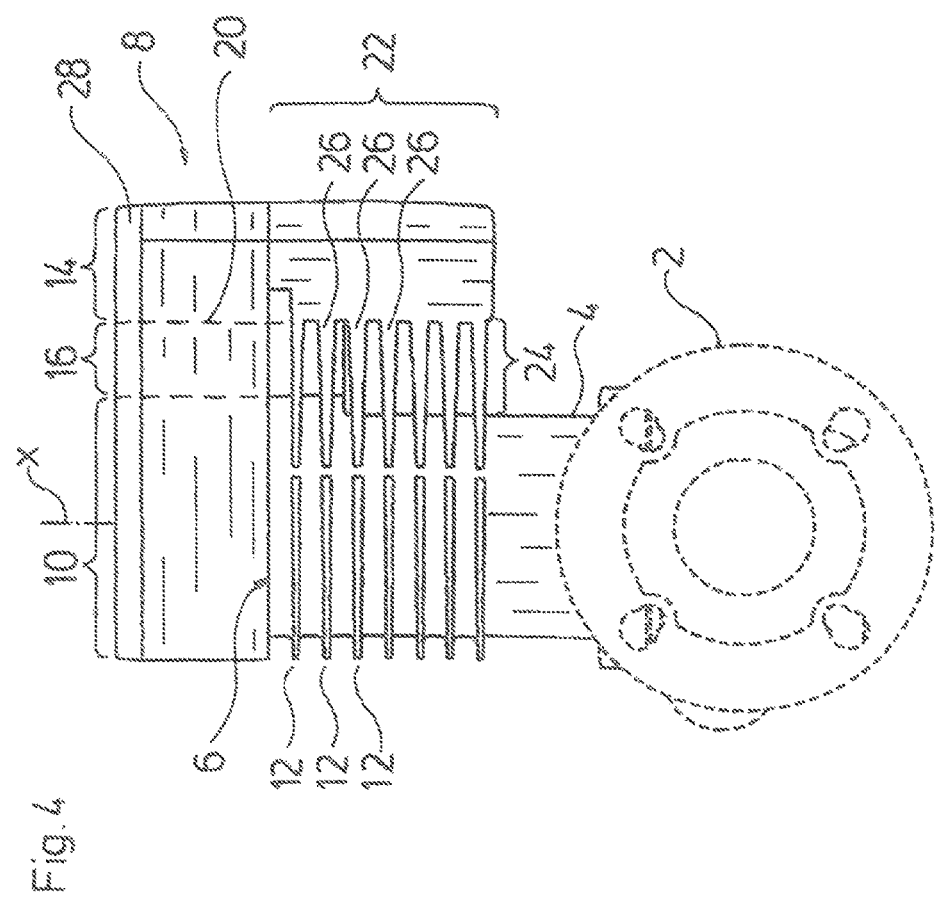
FIG. 4 is a schematic lateral view of a pump assembly according to a second embodiment of the invention.

With the embodiment according to FIG. 4, moreover, a third section 22 of the terminal box is provided, which essentially likewise comprises a cuboid-shaped basic shape and extends in the axial extension of the second section 14 parallel to the stator housing 4. Thereby, the third section 22 is spaced from the outer periphery of the stator hosing 4 in the radial direction, so that a free space 24 is formed between the outer periphery of the stator housing 4 and the outer wall of the third section 22. Cooling ribs 26 are arranged in this free space and, departing from the third section 22 of the terminal box, extend into the free space 24. The third section 22 is connected with its interior to the second section 14, so that a continuous interior is created, in which electronic components can be arranged. Moreover, this section can also be designed as one piece with the second section 14. The first section 10, the second section 14, and the connection section 16 are moreover likewise preferably designed as one piece and are closed by a common axial cover 28.

Figure 5:
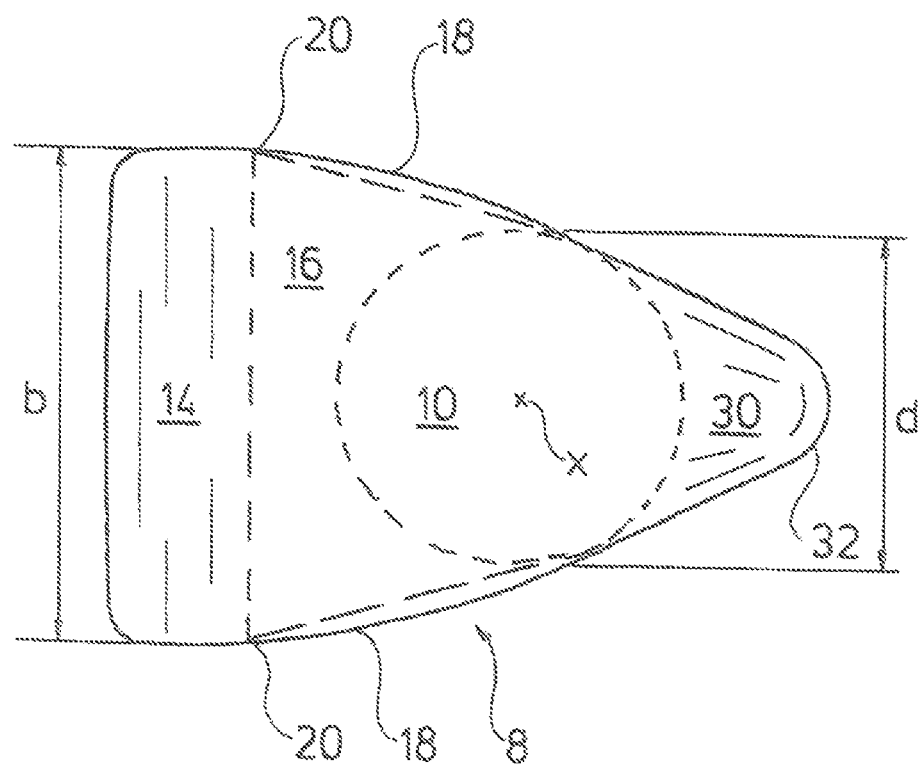
FIG. 5 is a plan view alone onto the terminal box according to a further embodiment of the invention.

FIG. 5 shows a further embodiment of the invention, which represents a modification of the previously described embodiment. FIG. 5 shows a view which corresponds to the representation in FIG. 3. In contrast to the embodiment in FIG. 3, in the embodiment according to FIG. 5 the terminal box 8 comprises a fourth section 30. This fourth section 30 is adjacent the first section 10 on the radial side. Thereby, the fourth section 30 is situated at the radial side of the first section 10, which is diametrically opposite to the second section 14. The fourth section 30 with this design is formed by a radial extension (with respect to the longitudinal axis or rotation axis X of the drive motor) of the connection section 16. That is, the side walls 18 of the connection section 16 are extended beyond the first section 10 and thus form the fourth section 30. At the radial end of the fourth section 30, the side walls 18 are connected to one another by way of an arched connection wall 32. The connection section 16 and the fourth section 30 connecting thereto thus together in the plan view form a trapezoidal or triangular basic shape, which fully receives the first section 10 with a circular basic shape. That is, the first section 10 in this embodiment does not appear externally, but rather forms an imagined axial extension of the stator housing 4.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An electric drive motor having a terminal box arranged on the electric drive motor, the terminal box comprising:
    a first section arranged at an axial end of the drive motor and a second section arranged radially to the first section, the second section being radially spaced from the first section, positioned entirely outside a radical extent of the electric drive motor and having a width (b) in a tangential direction which is larger than a diameter (d) of the first section in this direction, and
    the second section being connected to the first section via a connection section having two side walls spaced from one another, extending from the second section to the first section, and angled to one another in a manner, such that the two side walls approach one another towards the first section.

2. The electric drive motor according to claim 1, wherein the first section, the second section, and the connection section are situated on the axial end the drive motor.

3. The electric drive motor according to claim 1, wherein the first section, the second section, and the connection section define a common interior of the terminal box.

4. The electric drive motor according to claim 1, wherein the first section has a same peripheral contour as the axial end of the drive motor or a larger peripheral contour which is parallel to the peripheral contour of the axial end.

5. The electric drive motor according to claim 1, wherein the first section has a cylindrical basic shape.

6. The electric drive motor of claim 5, wherein the first section is circularly cylindrical.

7. The electric drive motor according to claim 1, wherein the second section has a prismatic basic shape.

8. The electric drive motor of claim 7, wherein the second section is cuboid-shaped.

9. The electric drive motor according to claim 1, wherein the two side walls spaced from one another, respectively departing from a side edge of the second section, extend in a manner tangentially adjacent the first section.

10. The electric drive motor according to claim 1, wherein the terminal box further comprises a third section which is an axial extension of the second section and is situated radially spaced from the drive motor in a peripheral region of the drive motor.

11. The electric drive motor according to claim 10, further comprising a free space between an outer periphery of the electric drive motor and the third section of the terminal box, and the free space in at least one predefined installed position of the drive motor extends in a vertical direction.

12. The electric drive motor according to claim 10, further comprising a free space between an outer periphery of the drive motor and the third section of the terminal box, and cooling elements situated in the free space and arranged on the drive motor and/or on the terminal box.

13. The electric drive motor according to claim 1, wherein the terminal box further comprises a fourth section radially adjacent the first section and at side of terminal box away from the second section.

14. The electric drive motor of claim 13, wherein the fourth section forms a radial extension of the connection section.

15. The electric drive motor according to claim 1, wherein at least two of the sections of the terminal box are designed as one piece.

16. The electric drive motor according to claim 1, wherein the terminal box is manufactured of plastic.

17. The electric drive motor according to claim 1, wherein the walls of the sections of the terminal box which are adjacent to one another merge into one another in a rounded manner without sharp edges.

18. The electric drive motor according to claim 1, wherein the first section, the second section, and the connection section at their axial ends away from the drive motor are closed by a common cover.

19. The electric drive motor according to claim 18, wherein operating elements and/or display elements are arranged on the cover.

20. A pump assembly comprising an electric drive motor according to claim.

21. The pump assembly according to claim 20, comprising a circulation pump assembly designed as a wet-running drive motor.

* * * * *